United States Patent [19]

Funcik et al.

[11] 4,164,065

[45] Aug. 14, 1979

[54] CRIMPING AND WIRE LEAD INSERTION MACHINE HAVING IMPROVED INSERTION MEANS

[75] Inventors: Jack F. Funcik, Downers Grove; Steven F. Wright, Glen Ellyn, both of Ill.

[73] Assignee: Molex Incorporated, Lisle, Ill.

[21] Appl. No.: 885,680

[22] Filed: Mar. 13, 1978

[51] Int. Cl.$^2$ ........................ B23P 23/00; B23P 19/02

[52] U.S. Cl. ...................................... 29/564.6; 29/753; 29/754

[58] Field of Search ................. 29/564.6, 564.1, 33 K, 29/33 M, 753, 754

[56] References Cited

U.S. PATENT DOCUMENTS

| | | | |
|---|---|---|---|
| 3,329,002 | 7/1967 | Schwalm | 29/753 X |
| 3,857,154 | 12/1974 | Hammond et al. | 29/753 X |
| 3,964,147 | 6/1976 | Fusco et al. | 29/754 X |
| 4,040,180 | 8/1977 | Brown | 29/753 |
| 4,074,424 | 2/1978 | Deshich et al. | 29/754 X |

*Primary Examiner*—Horace M. Culver

*Attorney, Agent, or Firm*—Louis A. Hecht

[57] ABSTRACT

A terminal crimping machine which, after crimping a terminal onto a wire lead, inserts the terminated wire lead into a terminal receiving recess of connector housing. The machine generally includes a press and die assembly mounted on the press. The die assembly includes a crimp station whereat terminal is crimped onto a wire lead, and insertion station whereat a terminated wire lead is presented, and a housing indexing assembly for supporting a plurality of connector housings and indexing a terminal receiving recess thereof at the insertion station. An insertion assembly is provided for inserting the terminated wire lead into a terminal receiving recess at the insertion station. The improvement in the insertion assembly includes a push member for engaging a terminal crimped on the end of a wire lead and inserting the terminal into the terminal receiving recess and providing guide means mounted on the punch holder above the insertion station for guiding a terminal into a terminal receiving recess.

3 Claims, 5 Drawing Figures

CRIMPING AND WIRE LEAD INSERTION MACHINE HAVING IMPROVED INSERTION MEANS

BACKGROUND OF THE INVENTION

1. Field of the Invention

The present invention relates generally to a machine for crimping a plurality of electrical terminals one at a time onto wire leads, and, more particularly, to a crimping machine capable of inserting the terminated wire lead into a connector housing.

2. A Brief Description of Prior Art

U.S. Pat. No. 4,074,424 granted Feb. 21, 1978, entitled "Crimping and Wire Lead Insertion Machine" and assigned to the assignee of the present invention, discloses a machine for crimping a plurality of electrical terminals one at a time onto wire leads and, in addition feeds and indexes connector housings and inserts terminated wire leads into terminal receiving recesses of a connector housing.

More particularly, the machine of the above-identified patent application, the contents of which are incorporated by reference herein, includes a press actuable for up and down movement and a die assembly mounted on the press. The die assembly includes a die shoe with a crimp station whereat a terminal is crimped onto a wire lead, an insertion station whereat a terminated wire lead is presented, and a housing indexing assembly for supporting at least one connector housing having a plurality of terminal receiving recesses formed therein and indexing one of said recesses at the insertion station. Associated with the die shoe is an insertion assembly for inserting the terminated wire lead into a terminal receiving recess at the insertion station. A punch holder is provided opposite and spaced from the die shoe mounted over the crimp station to crimp a terminal thereat. The die assembly also includes a terminal feed assembly for supporting and feeding the strip of terminals one at a time to the crimp station in response to the movement of the press.

The machine disclosed in U.S. Pat. No. 4,074,424 teaches the use of an insertion assembly including means for gripping a terminated wire lead at the crimp station. The assembly includes a pair of gripper members movable between an open position and a closed gripping position about the wire lead. These gripper members are mounted for movement between a normal crimp position where the end of the wire lead is held over the crimp station and an inserted position where the end of the terminated wire lead is moved to the insertion station and then back to the crimp position.

Although the machine disclosed in U.S. Pat. No. 4,074,424 works in a satisfactory manner, it has been found that some terminated wire leads cannot be successfully inserted into the terminal receiving recess. This occurs because the gripper members grip the wire. If the wire is not sufficiently stiff or large gauged, it will buckle when the gripper members are moved to its inserted position.

SUMMARY OF THE INVENTION

It is therefore, the principal object of the present invention to provide a machine of the type described having an improved insertion assembly which more reliably inserts terminated wire leads into terminal receiving recesses of connector housings.

The improvement comprising the invention whereby the above object is effected, generally includes the insertion assembly having a push member for engaging a terminal crimped at the end of a wire lead and inserting said terminal into the terminal receiving recess at the insertion station. The push member is mounted for programmed reciprocal movement in a direction substantially coincident with the longitudinal axis of the recess. The push member is movable in response to the press between a pre-insertion position not in contact with a terminal and an insertion position in engagement with the terminal inserted with a recess. The machine also includes a guide means mounted on the punch holder above the insertion station for guiding a terminal into a terminal receiving recess.

DESCRIPTION OF THE PREFERRED EMBODIMENT

Figure 1:
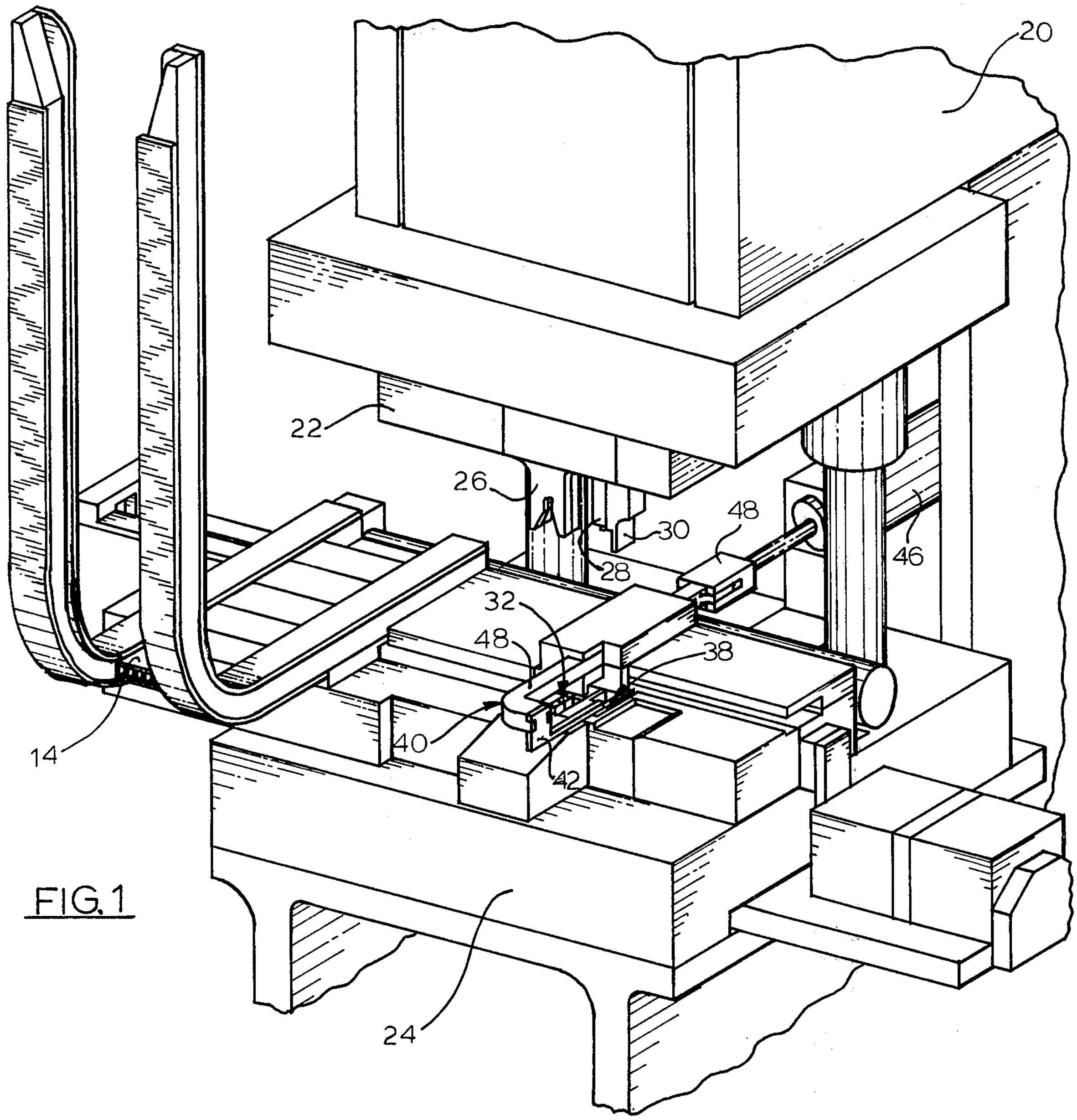
FIG. 1 is a partially fragmentary, perspective view of a portion of the machine of the present invention without terminals and wire leads.
Figure 2:
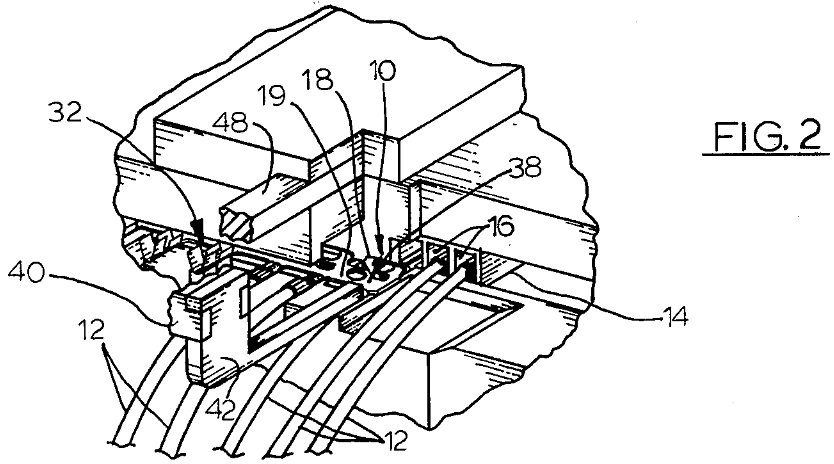
FIG. 2 is an enlarged perspective view of a portion of FIG. 1 showing the insertion station and the insertion assembly in greater detail prior to commencement of an insertion operation.

Turning now to the drawings, the crimping machine of the present invention is adapted to crimp a terminal, generally designated 10, onto a stripped insulation clad wire lead 12 as is the purpose of conventional crimping machines. The improvement comprising the patentable feature of the present invention resides in providing means for inserting a terminated wire lead into a connector housing, generally designated 14.

The housing 14 has a plurality of terminal receiving recesses 16. Each terminal 10 has a loop-shaped portion 18 and other features which are set forth in U.S. Pat. No. 4,074,424. The terminals 10 are integrally formed on a carrier strip 19.

Looking at FIG. 1, the machine of the present invention is seen to include a press, generally designated 20, and a die assembly which is made up of a punch holder 22 mounted on the press for up and down movement therewith and a die shoe 24 spaced from the punch holder. The punch holder, in addition to having a conventional set of crimp punches 26, also has a cutting blade 28 fixed to the punches and a spring loaded guide member 30 mounted thereon for reasons which will become more apparent hereinafter.

A crimp station, generally designated 32 (FIG. 1), is located on the die shoe 24 opposite the punches 26 whereat a terminal 10 is crimped onto a wire lead 12 in the conventional manner. The description of the necessary structure and operation of such a crimping machine is well known in the art and is disclosed in U.S. Pat. No. 4,074,424.

The machine also has a terminal feed assembly (not referenced) and a housing indexing assembly (not referenced). The structure and operation of the terminal feed assembly and housing indexing assembly are more fully set forth in U.S. Pat. No. 4,074,424.

Unlike the prior art crimp and insert machine, the machine of the present invention has an insertion station, generally designated 38, spaced from the crimp station 32. Associated with the insertion station 38 is an insertion assembly, generally designated 40, which includes a generally L-shaped push member 42 with an end 44 adapted to engage the loop-shaped portion 18 of a terminal 10 which has been crimped on the end of a wire lead 12. The push member 42 inserts the terminated wire lead into the terminal receiving recess 16 which is located at the insertion station 38.

Figure 4:
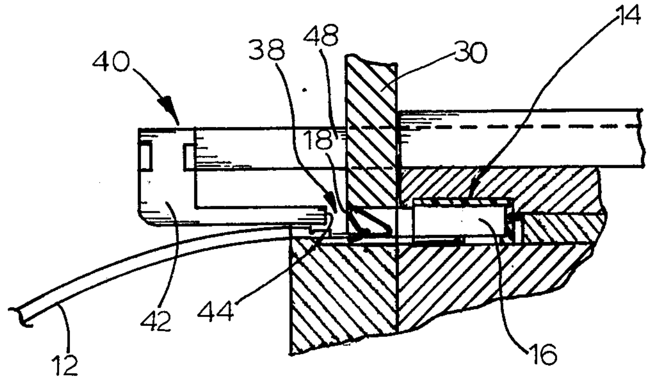
FIG. 4 is a sectional view taken generally along the line 4—4 of FIG. 3.
Figure 5:
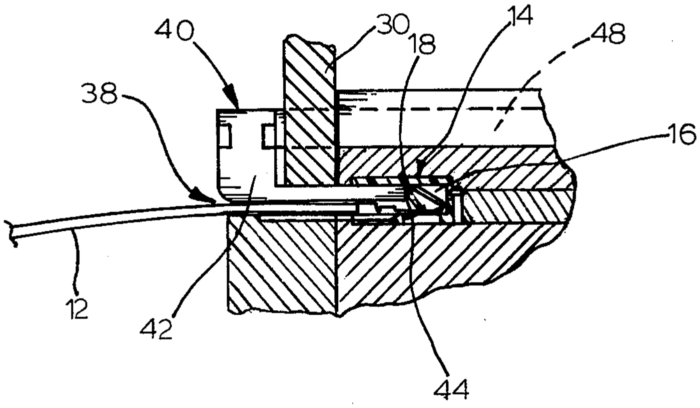
FIG. 5 is a sectional view similar to FIG. 4 showing the insertion assembly in an insertion position.

The push member 42 is mounted for programmed reciprocal movement in a direction substantially coincident with the longitudinal axis of the recess 16 and is associated with an air cylinder 46 through a linkage 48. The push member 42 is movable between a pre-insertion position not in contact with the terminal 10 as shown in FIG. 4 and an insertion position in engagement with the terminal 10 when inserted within the recess 16 as is shown in FIG. 5. After a terminated wire lead is inserted into a recess 16, the push member 42 is moved back to its initial pre-insertion position.

In operation, a person places a stripped wire lead 12 in the machine so that the stripped end thereof is received in an uncrimped terminal located at the crimp station 32 (not shown). The operator then actuates the machine in a conventional manner such as a foot switch (not shown). The press 20 is lowered which causes the crimping of the terminal 10 onto the wire lead 12. This is more fully described in U.S. Pat. No. 4,074,424.

Figure 3:
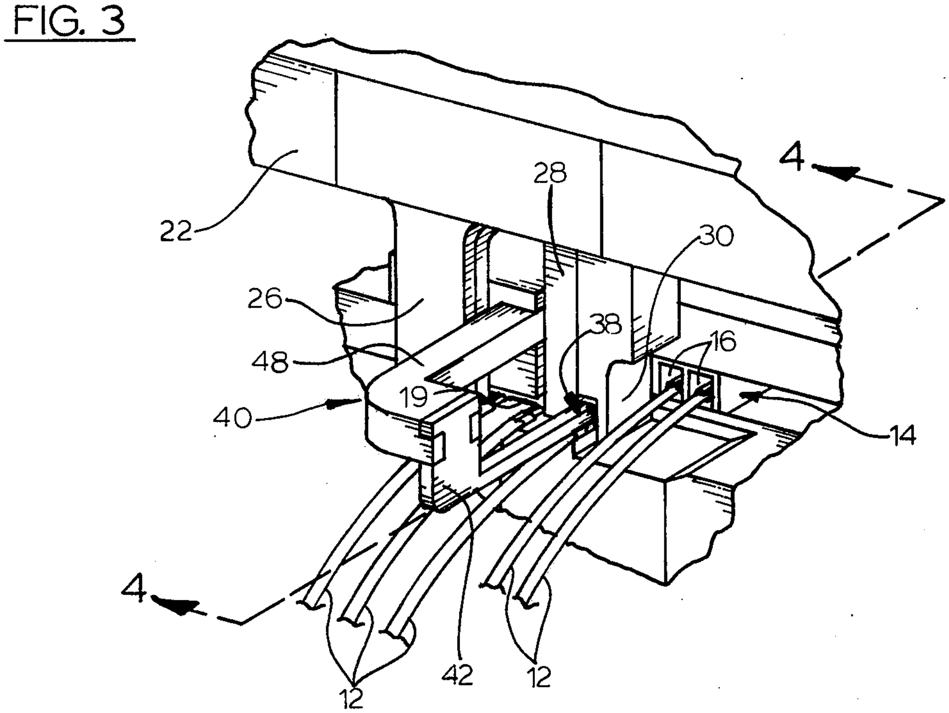
FIG. 3 is an enlarged perspective view similar to that of FIG. 2 showing the insertion assembly after actuation and in a pre-insertion position.

Simultaneously with the crimping operation, the insertion assembly 40 is inserting a terminated wire lead into a terminal receiving recess 16 of a housing 14. It is to be noted that the insertion station 38 is spaced from the crimp station 32. Accordingly, more than one wire (as illustrated in FIG. 3) may be crimped prior to its presentation at the insertion station 38. However, the terminals 10 are not simultaneously cut from the carrier strip 19 during the crimping operation as is normally the case. Instead, the terminated wire lead is severed from the remaining portion of the carrier strip 19 at the insertion station 38 when the cutting blade 28 is lowered with the punch holder 22 which will be described in greater detail hereinafter.

The insertion operation (as does the crimping operation) commences with the lowering of the punch holder 22. As the punch holder 22 descends, the bottom of the guide member 30 contacts a portion of the die shoe 24. By this time, the next terminated wire lead has been presented to the insertion station 38. Upon further downward travel of the punch holder 22, the guide member 30 is spring loaded and moves upwardly until the cutting blade contacts and then severs the carrier strip 19. This defines the lowermost extent or the bottom of the stroke.

At the bottom of the stroke (FIGS. 3–5), the terminal is confined within the space between the cutting blade 28 and the guide member 30 as is best shown in FIG. 3.

This confinement aids the accurate insertion of a terminal 10 into a recess 16.

Prior to the bottom of the stroke, push member 42 is actuated so that end 44 thereof engages the loop-shaped portion 18 of terminal 10 at the bottom of the stroke to insert the terminated wire lead to its insertion position within recess 16. This operation is best illustrated in FIGS. 4 and 5.

When the punch holder 22 is raised (FIG. 1), the housing indexing assembly indexes the next terminal receiving recess 16 and the terminal feed assembly 34 feeds the next unsevered terminated lead to the insertion station 38. Because the push member 42 directly engages terminal 10, there is little chance for a faulty insertion caused by buckling as was the case when the wire 12 was gripped for insertion.

We claim:

1. In a machine for crimping a plurality of electrical terminals one at a time onto wire leads, said machine including a press actuable for up and down movement and a die assembly mounted on said press, said die assembly including a die shoe with a crimp station whereat a terminal is crimped onto a wire lead, an insertion station whereat a terminated wire lead is presented, and a housing indexing assembly for supporting at least one connector housing having a plurality of terminal receiving recesses formed therein and indexing one of said recesses at the insertion station, an insertion assembly for inserting a terminated wire lead into a terminal receiving recess at the insertion station, a punch holder mounted on the press for movement therewith opposite and spaced from said die shoe having a crimp punch over the crimp station to crimp a terminal thereat, and a terminal feed assembly for supporting and feeding a strip of terminals one at a time to the crimp station in response to the movement of the press, the improvement comprising:

said insertion assembly including a push member for engaging a terminal crimped on the end of a wire lead and inserting said terminal into the terminal receiving recess at the insertion station, said push member being mounted for programmed reciprocal movement in a direction substantially coincident with the longitudinal axis of said recess in response to the press between a preinsertion position not in contact with the terminal and an insertion position in engagement with the terminal inserted within the recess; and guide means mounted on the punch holder above the insertion station for guiding the terminal into a terminal receiving recess.

2. The machine of claim 1 wherein said guide means including a cutting member in the spring loaded member spaced from said cutting member, the space between said cutting and spring loaded members defining an area to confine a terminal at the insertion station when the punch holder is down.

3. The machine of claim 2 wherein said cutting member has means for cutting a crimped terminal from the terminal strip when the punch holder is lowered.

* * * * *